United States Patent [19]

Catania

[11] 4,002,982

[45] Jan. 11, 1977

[54] MIXED ANALOG/DIGITAL TRANSMISSION SYSTEM USING RADIO LINK AND METHOD OF OPERATING SAME

[75] Inventor: Basilio Catania, Fiano (Turin), Italy

[73] Assignee: CSELT - Centro Studi e Laboratori Telecomunicazioni, Turin, Italy

[22] Filed: Nov. 24, 1975

[21] Appl. No.: 634,526

[30] Foreign Application Priority Data

Nov. 25, 1974 Italy .................................. 70425/74

[52] U.S. Cl. .............................. 325/39; 179/15 BY
[51] Int. Cl.² .......................................... H04B 1/00
[58] Field of Search .............. 179/15 BY; 325/315, 325/64, 39

[56] References Cited

UNITED STATES PATENTS 3,689,841   9/1972   Bello .................................... 325/39
3,701,851   10/1972   Starrett ......................... 179/15 BY Primary Examiner—Harold I. Pitts
Attorney, Agent, or Firm—Karl F. Ross; Herbert Dubno

[57] ABSTRACT

A receiving station for analog and digital messages, transmitted via a radio link, includes a sensor for a pilot frequency $f_p$ and a detector for a noise frequency $f_n$ both lying within the frequency spectrum of digital signals. A simulator at the receiver generates the noise frequency $f_n$ during high-speed digital transmission in response to an incoming frequency $f_1$ lying outside that spectrum; this simulator may also include a local source of pilot frequency $f_p$ or an equivalent signal generator which actuates the corresponding sensor in the presence of a synchronizing signal accompanying the digital message.

10 Claims, 4 Drawing Figures

MIXED ANALOG/DIGITAL TRANSMISSION SYSTEM USING RADIO LINK AND METHOD OF OPERATING SAME

FIELD OF THE INVENTION

My present invention relates to a system for alternately transmitting analog and digital messages between a sending station and a receiving station by way of a radio link, and more particularly to a message receiver in such a system.

BACKGROUND OF THE INVENTION

In a multichannel telecommunication system using frequency-division-multiplex/frequency-modulation (FDM/FM) signaling, for example, one or more message channels can be ocassionally allocated to data transmission. For such mixed transmission with alternation between analog and digital signals, the digital signals could be relegated to a base band different from that of the analog signals of the selected channel or channels or could be elevated to the intermediate-frequency band, yet these two solutions involve inconvenience in circuit design. The simplest and therefore generally preferred solution is to transmit the digitl signals or data in a low-frequency range replacing the base band of the analog signals.

In the latter type of telecommunication system it is known to transmit a pilot wave of predetermined frequency $f_p$ over such a channel along with the analog message signals in one mode of operation, that pilot wave being monitored by a sensor to test the continuity of the established connection; in another mode of operation, i.e. with transmission of digital signals, that pilot wave is usually suppressed. It is also general practice to equip the receiver with a detector for noise signals arising during transmission in a band of low frequencies not used for the analog signals, the detector responding to a central frequency $f_n$ of that band which is sometimes referred to as a noise window. In the second mode of operation, however, the range of frequencies required for high-speed data transmission generally encompasses the noise window, the pilot frequency $f_p$ and all or part of the frequency spectrum used in the first mode for the transmission of analog signals over the selected channel. Thus, different noise-frequency detectors and pilot-wave sensors would be required for the two modes of operation, especially if the channel capacity is to be fully utilized with high-speed data transmission requiring monitoring of the noise signals at the receiving end for proper evaluation of the incoming digital information.

OBJECTS OF THE INVENTION

The general object of my present invention, therefore, is to provide an improved receiver for analog-digital messages, alternately transmitted in a system of the aforedescribed kind, which utilizes the same basic equipment for both modes of operation.

A related object is to provide a method of operating such a communication system in a manner enabling the utilization of existing receiving equipment, especially pilot-wave sensors and noise-frequency detectors conventionally used with analog signals, also during data transmission by means of digital signals.

SUMMARY OF THE INVENTION

In accordance with one aspect of my invention, a receiver for analog and digital messages transmitted from a remote station via a radio link comprises ancillary circuitry connected to the output of a demodulator for supplying a simulated noice frequency $f_n$ to a processor including a conventional detector for that frequency, during the reception of digital signals, in response to an incoming frequency $f_i$ lying within the base band of a selected channel but outside the frequency range occupied by these digital signals. Frequency $f_n$ may be obtained with aid of frequency-changing means transposing the incoming frequency $f_i$ to the band serving as a noise window during analog transmission.

Pursuant to another feature of my invention, the ancillary circuitry also includes a generator of a simulated pilot frequency $f_p$ connected to a corresponding sensor in the processor under the control of an extractor for synchronizing signals accompanying the digital message signals, the extractor interrupting the transmission of the simulated pilot frequency $f_p$ from the local generator to the sensor.

Thus, another aspect of my invention involves the transposition of incoming noise signals at a frequency $f_i$, lying outside the noise-frequency band utilized during analog-signal transmission, into this band at the receiver in order to avoid the need for switching to a separate noise-frequency detector during data transmission.

BRIEF DESCRIPTION OF THE DRAWING

The above and other features of my invention will now be described in detail with reference to the accompanying drawing in which.

SPECIFIC DESCRIPTION

Figure 1:
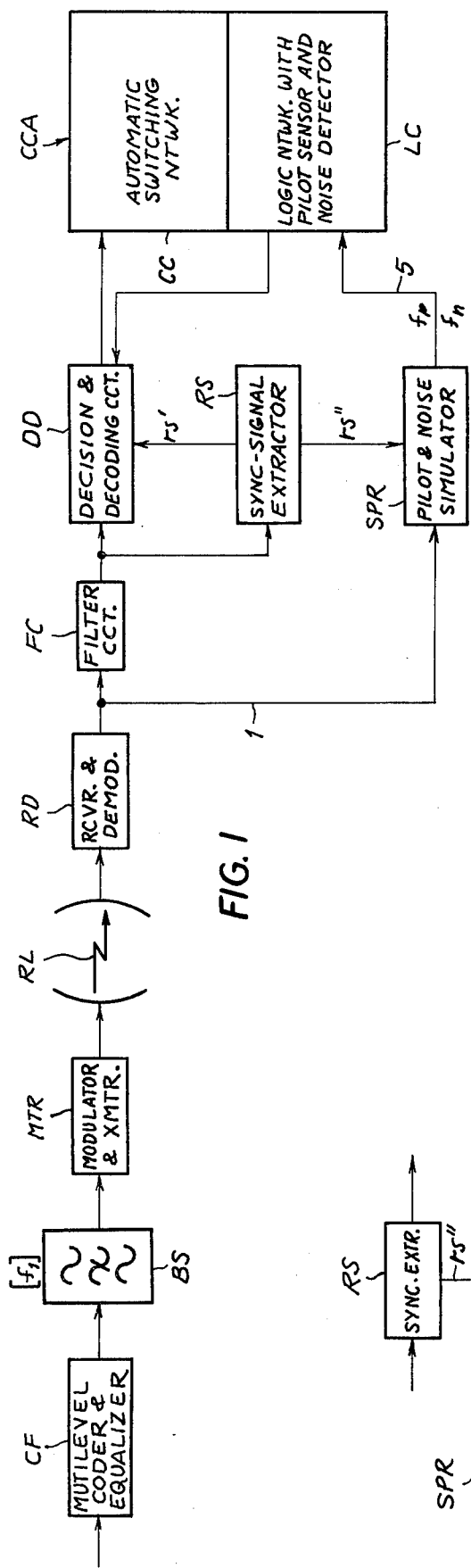
FIG. 1 is block diagram of a transmission system embodying my invention.

The communication system shown in FIG. 1 comprises a sending station and a receiving station interconnected by a radio link RL with a multiplicity of channels having different carrier frequencies. A multilevel coder CF at the sending station including the usual filtering and equalizing equipment works into a modulator and transmitter MTR for the respective carrier. A band-stop filter BS, tuned to the aforementioned frequency $f_1$, is shown interposed between components DF and MTR in the path of low-frequency signals to be modulated onto one of the channel carriers, e.g. a carrier of a standby channel to be used either for voice or for data transmission accordingg to traffic requirements.

At the receiving station, a receiver and demodulator RD recovers the original base band fed into the modulator MTR at the sending station, i.e. analog signals accompanied by a pilot wave of frequency $f_p$ during a first mode of operation and digital signals accompanied by synchronizing signals during a second mode. In the first mode, the low-frequency output of the demodulator in circuit RD includes noise signals in a band adjoining the spectrum of the analog-signal frequencies, this band being unused at the transmitting side so that its center frequency $f_n$ represents only noise picked up along the transmission path between the two stations. These low frequencies are delivered via a filter circuit FC to a decision and decoding circuit DD and in parallel therewith to a sync-signal extractor RS. Extractor RS has an output rs' for synchronizing pulses, delivered to circuit DD, and another output rs'' which is energized through an integrating network (not shown) as long as a sync signal is present and which is de-energized upon prolonged absence of such signal.

Figure 3:
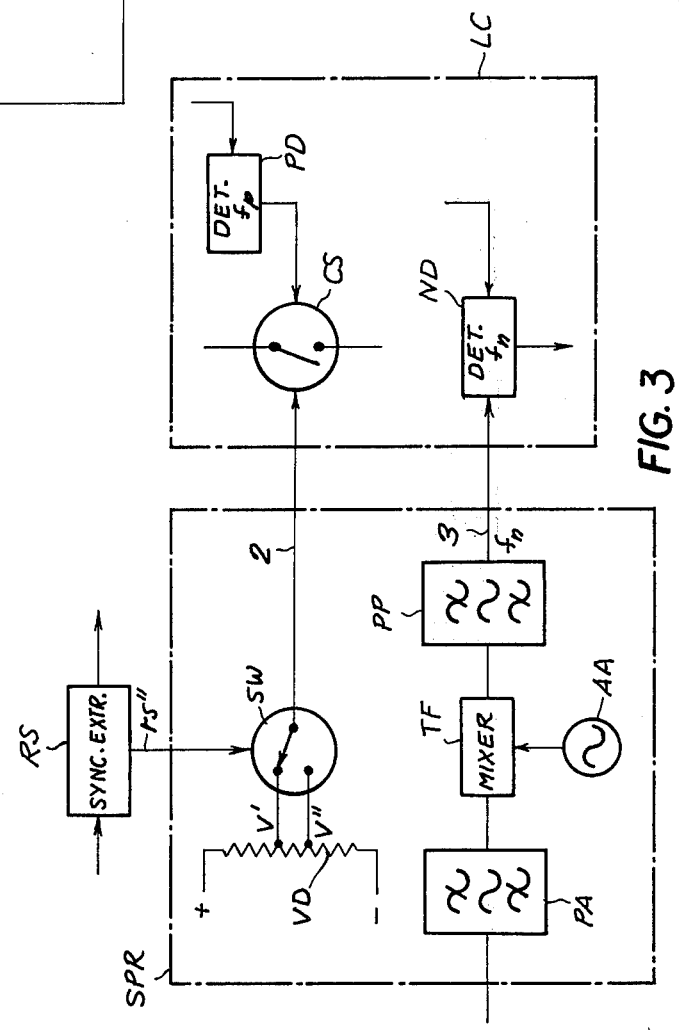

Circuit DD works into a processor CCA for the demodulated signals, this processor including an automatic switching network CC and a logic network LS. The latter comprises a sensor for the pilot frequency $f_p$ and a detector for the noise frequency $f_n$; these elements, illustrated in FIG. 3, are internally connected within processor CCA to the output of decision circuit DD for commanding certain switching operations within network CC and feeding back reference signals to circuit DD in a manner well known and not further illustrated.

In accordance with an important feature of my present invention, the receiving station of FIG. 1 further comprises a pilot and noise simulator SPR connected via a line 1 directly to the output receiver and demodulator RD, thus bypassing the filter FC. The low-frequency signals reaching the simulator SPR thus include the special frequency $f_l$ which is rejected by filter FC and also represents noise generated in transmission. During reception of digital signals, the noise band centered on frequency $f_n$ lies within the frequency range of these incoming signals; thus, that band cannot be used for the measurement of noise level as it is during receptions of analog signals.

Simulator SPR responds to frequency $f_l$ on line 1 to supply substitute frequencies $f_p$ and $f_n$ by way of a line 5 to the pilot sensor and the noise detector in network LC during data reception. Frequency $f_l$ is preferably higher than the pilot frequency $f_p$. Components FC, DD and SPR are individual to the channel here considered.

Figure 2:
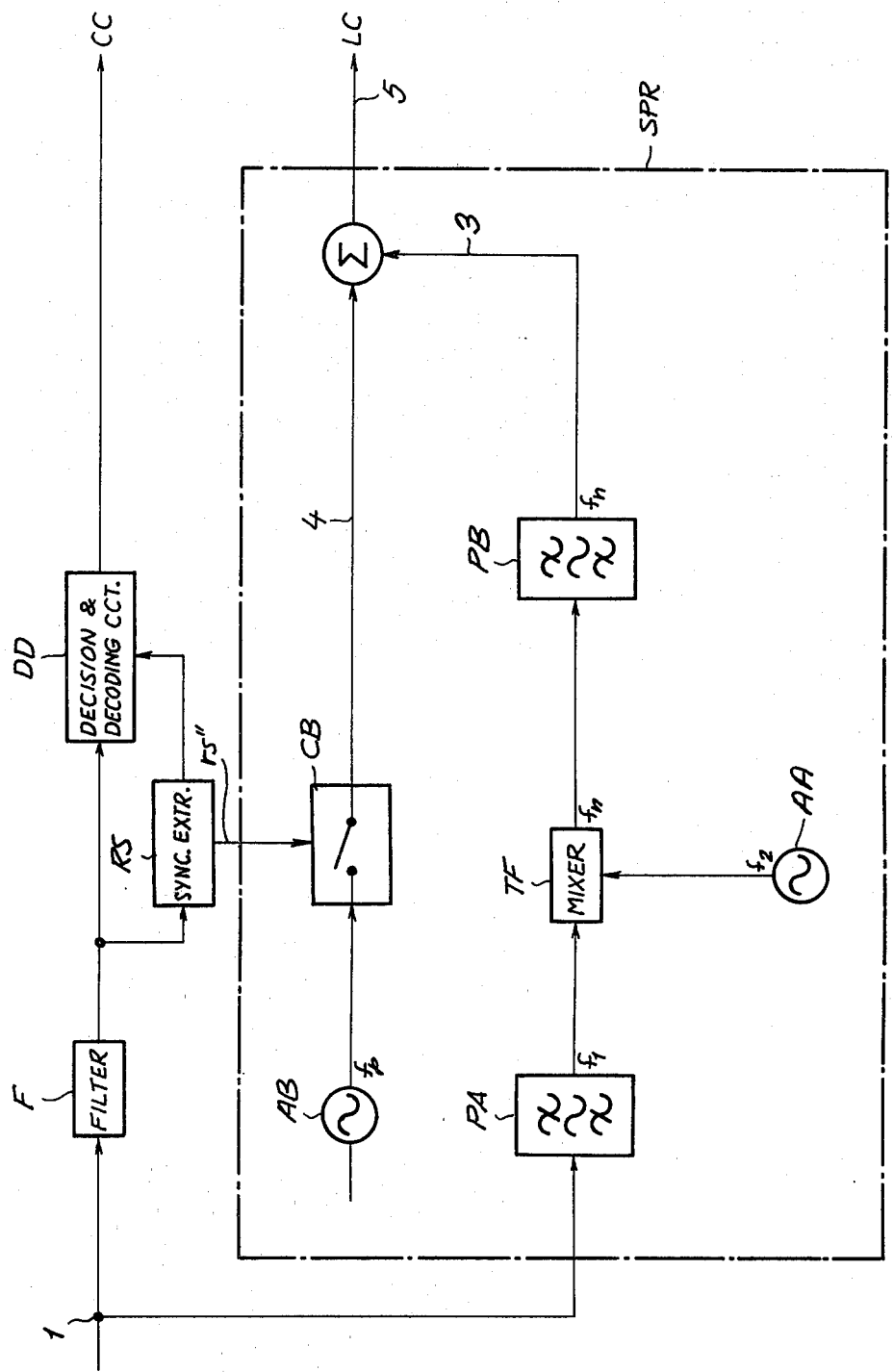
FIG. 2 is a more detailed diagram of a simulator forming part of a receiver in the system shown in FIG. 1.

Reference will now be made to FIG. 2 for a more detailed description of simulator SPR which in this embodiment comprises a band-pass filter PA centered on frequency $f_l$; filter PA is connected to line 1 and workd into a mixer TF serving to transpose that frequency to the level $f_n$ within the normal noise window. Mixer TF has another input energized by a local oscillator AA which generates a heterdyning frequency $f_2$ whose additive or subtractive combination with frequency $f_l$ yields the frequency $f_n$ which is isolated by a further band-pass filter PB. Another local oscillator AB generates a substitute pilot frequency $f_p$ which, via a circuit breaker CB controlled by the output rs'' of extractor RS, is delivered via a lead 4 to a summing circuit $\Sigma$ also receiving on a lead 3 the frequency $f_n$ passed by filter PB. Summer $\Sigma$ transmits the two frequencies $f_p$ and $f_n$ by way of lead 5 to network LC (FIG. 1) where they are separated and fed to the pilot sensor and the noise detector, respectively.

Circuit breaker CB is closed only upon energization of extractor output rs'', i.e. upon reception of digital signals accompanied by sync signals. During reception of analog signals, therefore, the pilot sensor responds only to the frequency $f_p$ transmitted by the remote station. If desired, the delivery of the substitute noise frequency $f_n$ to the noise detector in network LC may be similarly cut off, under the control of extractor RS, during reception of analog messages.

Figure 4:
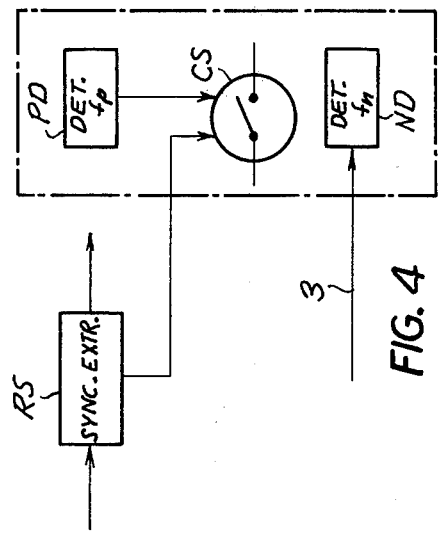
FIGS. 3 and 4 are fragmentary diagrams showing partial modifications of the simulator of FIG. 2.

Instead of controlling the emission of a substitute pilot frequency $f_p$, the extractor RS may deliver a switching signal directly or through simulator SPR to a continuity switch CS of the pilot sensor normally controlled by the output of a detector PB (FIGS. 3 and 4) responsive to the frequency $f_p$ in the base band passed by filter FC. Thus, as shown in FIG. 3, output rs'' of extractor RS may control a switch SW in simulator SPR for delivering different voltages V' and V'', taken from respective taps of a voltage divider VD, by way of a lead 2 to the switch CS in network LC wherein a detector ND receives the substitute noise frequency $f_n$ on lead 3. It is also possible, as shown in FIG. 4, to extend the extractor output rs'' directly to network LC for the operation of the continuity switch MS.

The signal simulator SPR according to my invention may be installed temporarily in a receiving section of a central office about to be converted from analog-signal reception to mixed reception, pending introduction of conventional data-receiving equipment permanently associated with certain incoming channels. In other instances of mixed transmission such a simulator may be put into service only during times of peak traffic in which data signals must be communicated at high speeds, thus within an extended frequency range.

I claim:

1. In a receiving station for analog and digital messages transmitted from a remote station via a radio link, in combination:
   a demodulator for incoming high-frequency waves modulated with analog message signals in one mode of operation and with digital message signals in another mode of operation, said analog message signals lying outside a predetermined noise-frequency band, said digital message signals lying in a frequency range encompassing said noise-frequency band and at least part of the frequency spectrum of said analog message signals;
   a processor for message signals derived from said incoming waves by said demodulator, said processor including detector means for ascertaining the noise level in said noise-frequency band; and
   ancillary circuitry connected to the output of said demodulator and resonsive to a predetermined incoming frequency outside said frequency range for supplying a simulated noise frequency to said detector means in said other mode of operation.

2. The combination defined in claim 1 wherein said ancillary circuitry includes frequency-changing means for transposing said predetermined incoming frequency to said noise-frequency band for transmission to said detector means as said simulated noise frequency.

3. The combination defined in claim 2 wherein said frequency-changing means comprises a local oscillator and a mixer.

4. The combination defined in claim 1 wherein said processor includes sensing means for monitoring a pilot frequency accompanying said analog message signals in said one mode of operation, further comprising an extractor for synchronizing signals accompanying said digital message signals, said extractor being connected to the output of said demodulator upstream of said processor, said sensing means being controllable by said extractor in the absence of said synchronizing signals in said other mode of operation.

5. The combination defined in claim 4 wherein said ancillary circuitry includes a generator of a simulated pilot frequency connected to said sensing means and a circuit breaker controlled by said extractor for interrupting the connection between said generator and said sensing means upon prolonged absence of said synchronizing signals.

6. The combination defined in claim 4 wherein said sensing means includes a continuity switch controlled by a pilot-frequency detector in said one mode of operation, said ancillary circuitry including actuating means for reversing said continuity switch under the control of said extractor in said other mode of operation.

7. A method of operating a communication system, including a radio link, for the alternate transmission of analog and digital message signals from a sending station to a receiving station equipped with a detector circuit for measuring noise signals of a frequency $f_n$, comprising the steps of:

modulating a carrier at said sending station in a first mode of operation with low-frequency oscillations including analog message signals while keeping unused an adjoining noise-frequency band containingg said frequency $f_n$;

modulating said carrier at said sending station in a second mode of operation with low-frequency oscillations including digital message signals occuping a frequency range which encompasses said noise-frequency band and at least part of the frequency spectrum of said analog message signals;

demodulating said carrier at said receiving station to recover said low-frequency oscillations;

separating incoming noise signals at a frequency $f_1$ outside said frequency range from said low-frequency oscillations at said receiving station in said second mode of operation; and transposing said incoming noise signals to said frequency $f_n$ for actuating said detector in said second mode of operation.

8. A method as defined in claim 7 wherein said analog message signals are accompanied by a pilot wave of frequency $f_p$ monitored by a sensor at said receiving station, comprising the further step of generating substitute signals for said pilot wave at said receiving station and feeding said substitute signals to said sensor in said second mode of operation.

9. A method as defined in claim 8 wherein said frequency $f_1$ is higher than said frequency $f_p$.

10. A method as defined in claim 8, comprising the further steps of extracting synchronizing signals accompanying said digital message signals from said low-frequency oscillations at said receiving station in said second mode of operation and halting the feeding of said substitute signals to said sensor at said receiving station in the absence of said synchronizing signals.

\* \* \* \* \*